US011270558B2

(12) United States Patent
Bailey

(10) Patent No.: US 11,270,558 B2
(45) Date of Patent: *Mar. 8, 2022

(54) AUTOMATED TELLER MACHINE WITH AN ADJUSTABLE DISPLAY

(71) Applicant: Capital One Services, LLC, McLean, VA (US)

(72) Inventor: Michael Bailey, Dallas, TX (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/010,581

(22) Filed: Sep. 2, 2020

(65) Prior Publication Data

US 2021/0005061 A1 Jan. 7, 2021

Related U.S. Application Data

(60) Continuation of application No. 16/411,601, filed on May 14, 2019, now Pat. No. 10,796,536, which is a
(Continued)

(51) Int. Cl.
*G07F 19/00* (2006.01)
*G06K 7/10* (2006.01)
(Continued)

(52) U.S. Cl.
CPC .......... *G07F 19/205* (2013.01); *G06F 1/1601* (2013.01); *G06K 7/10297* (2013.01); *G06K 9/00255* (2013.01); *G06K 9/00624* (2013.01); *G06Q 20/1085* (2013.01); *G06F 3/0482* (2013.01); *G06F 3/0484* (2013.01)

(58) Field of Classification Search
CPC .... G07F 19/205; G06F 1/1601; G06F 3/0484; G06F 3/0482; G06K 7/10297; G06K 9/00624; G06K 9/00255; G06Q 20/1085; G06Q 20/40145
See application file for complete search history.

(56) References Cited

U.S. PATENT DOCUMENTS 4,720,154 A 1/1988 Seiter
4,735,289 A 4/1988 Kenyon
(Continued)

FOREIGN PATENT DOCUMENTS

CN 102635297 A 8/2012
CN 202627861 U 12/2012
(Continued)

*Primary Examiner* — Seung H Lee
(74) *Attorney, Agent, or Firm* — Hunton Andrews Kurth LLP

(57) ABSTRACT

An automated teller machine ("ATM") is described. The ATM can be provided with an interface area which includes a display unit and one or more sensors. The display unit can move relative to the interface area so that the display is better accessible for a user of the ATM. For example, the display can make translational or rotational movements, e.g., telescoping movements. The ATM can include a sensor which can detect an object, a location for the object and a distance from the object. Using this information, the ATM can move or guide the display in a direction which makes the display more accessible for the user.

20 Claims, 8 Drawing Sheets

Related U.S. Application Data division of application No. 16/235,364, filed on Dec. 28, 2018, now Pat. No. 10,347,091.

(51) Int. Cl.
  *G06Q 20/10* (2012.01)
  *G06K 9/00* (2022.01)
  *G06F 1/16* (2006.01)
  G06F 3/0484 (2022.01)
  G06F 3/0482 (2013.01)

(56) References Cited

U.S. PATENT DOCUMENTS

| | | |
|---|---|---|
| 6,296,079 B1 | 10/2001 | McNaughton |
| 6,422,158 B1 | 7/2002 | Fitts, Sr. et al. |
| 7,240,829 B2 | 7/2007 | Graef et al. |
| 8,632,000 B2 | 1/2014 | Laracey |
| 8,833,538 B2 | 9/2014 | Oh |
| 10,347,091 B1 * | 7/2019 | Bailey .................. G06F 1/1601 |
| 10,796,536 B2 * | 10/2020 | Bailey ................ G06K 9/00624 |
| 2007/0034683 A1 | 2/2007 | Eastman et al. |
| 2012/0265679 A1 | 10/2012 | Calman et al. |
| 2016/0162855 A1 | 6/2016 | Johnson et al. |

FOREIGN PATENT DOCUMENTS

| | | |
|---|---|---|
| CN | 104637189 A | 11/2013 |
| CN | 206039734 U | 3/2017 |
| CN | 207233119 U | 4/2018 |
| CN | 208014102 U | 10/2018 |
| JP | 2017537678 A | 12/2017 |
| NL | 1021275 C2 | 2/2004 |

* cited by examiner

AUTOMATED TELLER MACHINE WITH AN ADJUSTABLE DISPLAY

CROSS REFERENCE TO RELATED APPLICATION

The subject application is a Continuation of U.S. application Ser. No. 16/411,601 filed May 14, 2019, which is a Divisional of U.S. application Ser. No. 16/235,364 filed Dec. 28, 2018, the contents of which is hereby incorporated by reference in their entireties.

BACKGROUND

An automated teller machine ("ATM") is an electronic telecommunications device which enables certain transactions at any time and without the need for direct interaction with bank staff. ATMs are ubiquitous these days. ATMs can be found at drive-through locations or even indoor locations.

SUMMARY

Some ATMs include an interface area, which can include a screen or a display, a keypad, a card reader and other components. Generally, customers interact with the ATMs by providing commands to these machines or retrieving money from them. In other words, users generally interact with the interface area of the ATMs. Therefore, the location and layout of the interface area can be important for accessibility of an ATM. For example, if the interface area of an ATM is too elevated relative to the ground, users might have difficulty reaching the interface area, and thus, it worsens the accessibility of the ATM.

For drive-through locations, generally the interface area of the ATMs are mounted at a height appropriate for access by an average driver of an average vehicle driving through the location. However, there is great disparity between vehicle heights. For example, the driver seat of a convertible car can be at a much lower height compared to the driver seat of a pick-up truck. Similarly, the users of ATMs can have different body sizes, which further complicates accessibility to these machines. As a result, an ATM designed for access by an average car might be convenient to reach for some drivers, but the design cannot accommodate all the drivers at the same time.

Moreover, regardless of the size of a vehicle or the driver of the vehicle, at a drive-through location, the ATM will not be accessible to the driver if the vehicle is not appropriately parked in relation to the ATM. In other words, the driver must still park the vehicle close enough to the ATM so that the interface area of the ATM is still reachable for the driver. However, this is not an easy task for many drivers. In fact, many drivers drive the vehicle back and forth a few times before they park the car at a location that is close enough to the ATM.

The problem of accessibility of ATMs is not limited to drive-through locations. Even for indoor locations, accessibility has been an issue. Some manufacturers design indoor ATMs based on the average height of the users accessing the machines. However, as with drive-through ATMs, there is great disparity between the heights of users of these ATMs. For example, these ATMs might not be accessible for wheelchair-bound individuals or individuals with disabilities. Therefore, it is an object of this disclosure to describe an adaptable or adjustable ATM which can facilitate access for all users.

In an example embodiment, an ATM is described. The ATM can be provided with an interface area which includes a display unit and one or more sensors. The display unit can move relative to the interface area so that the display is better accessible for the user (or the interface area can move relative to a housing of the ATM). For example, the display or the interface area can make translational or rotational movements, e.g., telescoping movements.

In one embodiment, the one or more sensors can detect an object, a location for the object and a distance from the object. Using this information (and possibly other information obtained by the sensors or other components of the ATM), the ATM can move or guide the display or the interface area in a direction which makes the display or the interface area more accessible for the user.

In one embodiment, the ATM can connect to a smart device carried by the user. The smart device can provide commands and signals to the ATM, and using the commands or signals, the user can adjust the position of the display or the interface area such that the display or the interface area can be accessible for the user. In another embodiment, the ATM stores specific settings or adjustments for objects of a particular type, e.g., convertible cars. When the sensor of the ATM detects the specific object approaching the ATM, the ATM adjusts the display or the interface area as provided in the memory of the ATM.

DETAILED DESCRIPTION

In an example embodiment, the ATM can include a housing. Various components of the ATM can be located it the housing. The housing can include an access door for feeding various supplies and money into the ATM. The housing can also include an interface area. The housing can protect various components of the ATM against damage and vandalism. The housing can also enhance the aesthetics of the ATMs.

Figure 1:
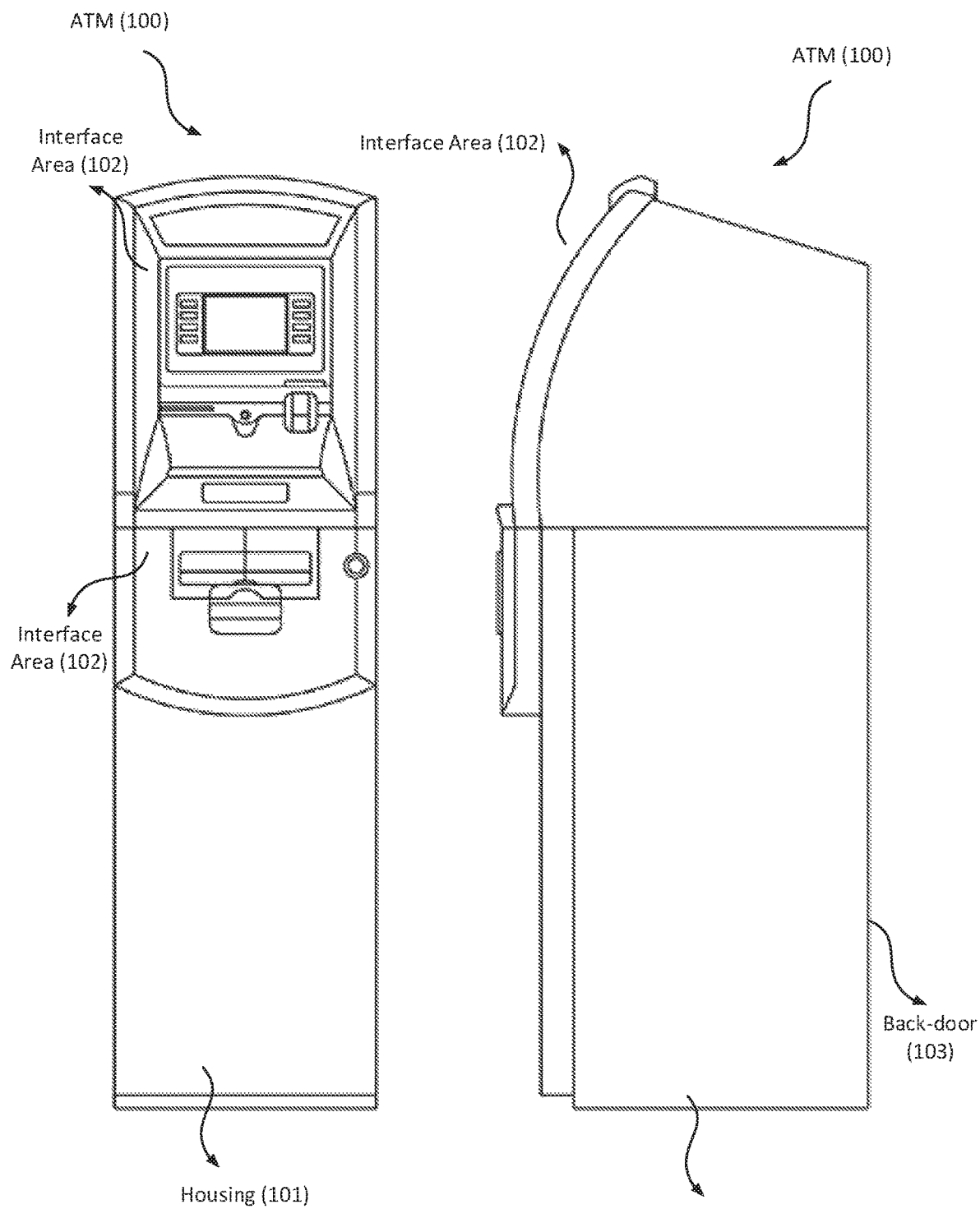
FIG. 1 shows front and side views of an ATM according to an example embodiment.

FIG. 1 shows front and side views of an ATM 100 according to an example embodiment. In this example embodiment, the ATM 100 includes a housing 101 and an interface area 102. The ATM can also include a back-door 103, which facilitates access to the inner components of the ATM as well as a vault.

The Components of the ATM

In an example embodiment, the ATM can include a vault. Certain parts or components of the ATM can require restricted access, and the vault can store these parts or components. For example, the vault can protect a processing unit. The vault can also be used as a storage for money. In some embodiments, the money can be placed in cassettes and the vault can include a space for storing the cassettes.

In an example embodiment, an ATM can include a processing unit. The processing unit can include a processor, a memory (and/or hard drive), a transmitter and a receiver. The processor can execute and run an operating system software stored on the memory (and/or hard driver) of the processing unit. Using the transceivers (i.e., transmitters and receivers), the processor can connect to a network, such as the Internet. The processor can also send and receive various signals to other components of the ATM, e.g., a display, a cash dispenser, a card reader or a sensor. Using these signals, the processor can control the operation of these components. The processor can also cause the operating system software to show a user interface on a display of the ATM. In some embodiments, the processor, using the transceivers, can communicate with a smart device, which can be a mobile device, a cellphone, a smartphone, a laptop, a desktop, a notebook, a tablet, a wearable device, etc.

In some embodiments, the ATM can include a secure cryptoprocessor. The secure cryptoprocessor is a dedicated computer on a chip or microprocessor for carrying out cryptographic operations, embedded in a packaging with multiple physical security measures, which give it a degree of tamper resistance. The secure cryptoprocessor can be located in a secure enclosure or the vault.

In an example embodiment, the ATM can include a card reader. There can be several types of card readers, e.g., contact and contactless. A card reader can read information from and write information onto a smart card. In some embodiments, the card reader can pass information from the smart card to processing unit and write information from the processing unit into the smart card. The card reader can provide power to the smart card and link the card's hardware interface to the processing unit. Since the smart card's processor can control the actual flow of information into and out of the card's memories, the card reader can operate with only minimal processing capabilities for sending the information to the processing unit.

In some embodiments, the card reader can include a processor and a transceiver. The contact type smart cards generally include an interface, which can consist of an 8-contact connector (e.g., contact pad 102). The interface can look like a small gold circle or series of squares on the surface of the card. Other arrangements are also possible. The card reader can include several connector pins. In order for a card reader to communicate with the contact-type card, the pins of the card reader's connector must physically touch the contacts on the smart card's connector during data transfer. The processor of the card reader can decode any data received from the smart card. The card reader can also update, delete or modify the information stored on the smart card.

A card reader can write data on the smart card by passing the data to the processor of the smart card. The processor can process the data and store it in the smart card's memory. A card reader can have a two-way communication with a smart card as described in ISO 14443. The smart card can include an RFID tag. The two-way communication can be digitally encoded. There can be several frequency ranges, and several proprietary formats for the two-way communication (e.g., HID in the 125 Mhz range). The 13.56 Mhz frequency range (NFC) is dominated by ISO 14443 compatible cards.

A card reader and a smart card can exchange messages, which can include commands or data. For example, a card reader can send a command message to the smart card, the smart card can process the command message in its processor and the smart card can send back a response message to the card reader. Each of the command message and the response message can include data. A message can include TLV (Type, Length and Value) data and a command such as STORE DATA command which prompts storage of the data included in the message in the smart card.

In an example embodiment, the ATM can include a keypad or other input devices. the keypad can include one or more keys for receiving commands from a user. For example, using the keypad, the user can select one or more options displayed on a display of the ATM. The ATM can include other input devices. For example, the ATM can include a touch pad screen, which can receive input or commands from the user. In some embodiment, the ATM can include one or more function key buttons. These function key buttons can be placed on the interface area of the ATM machine, e.g., next to the display.

In an example embodiment, the ATM can include a display. The display can be any display known in the art. For example, the display can be an LCD, CRT, OLED, AMO-LED, e-Ink, electronic paper, etc. The display can show a user interface of the operating system. The user interface can show various options for operating the ATM. For example, the user interface can display various options for retrieving cash from the machine. In some embodiments, the display can be a touch screen display. For example, the user can navigate through the options of the user interface by touching the screen of the display.

In an example embodiment, the ATM can include a printer. The printer can print paper record for each transaction conducted at the ATM. For example, the printer can be a thermal printer, which can produce a printed image by selectively heating coated thermochromic paper when the paper passes over the thermal print head. Other printers are also known in the art and one of ordinary skill in the art recognizes that these printers can be used in the ATM.

In an example embodiment, the ATM can include various indicators. For example, the indicators can be LED lights which can inform the user about the status of the device, e.g., the device is out of order. In one embodiment, an indicator can indicate whether the user is close enough to the ATM so that the user can easily access the ATM. The user can see the indicator and move, e.g., the user's car, closer to the ATM.

In an example embodiment, the ATM can include at least one sensor. The sensors will be discussed below in detail.

Figure 2:
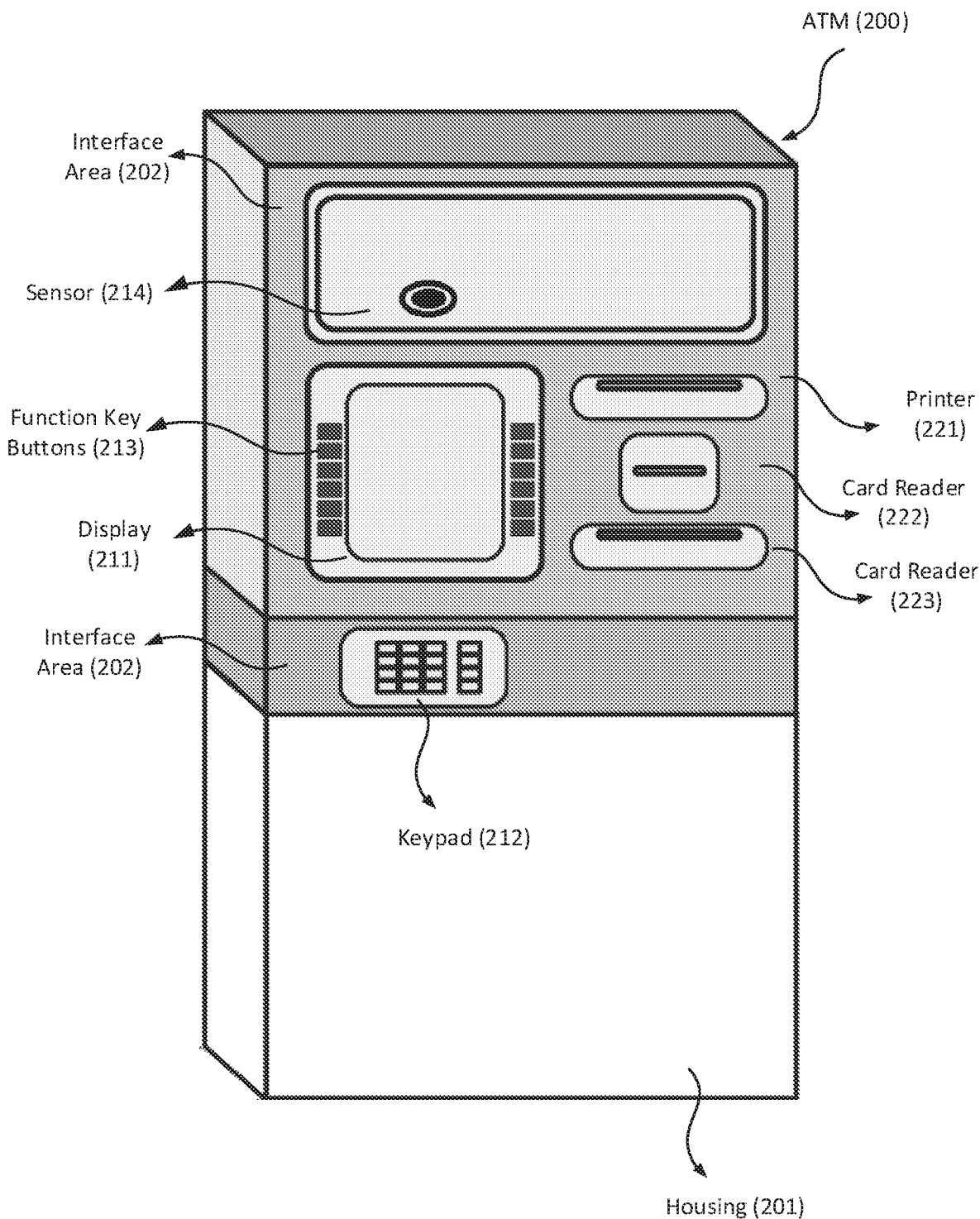
FIG. 2 shows an interface area of another ATM according to an example embodiment.

FIG. 2 shows the interface area 202 of an ATM 200 according to an example embodiment. The ATM 200 has a housing 201 and the interface area 202 is located on the top front of the housing 201. On the interface area 202, there is a display 211, a keypad 212, a set of function key buttons 213, a sensor 214. The interface area 202 also has a few orifices for providing prints from a printer 221, receiving and reading a smart card using a card reader 222 and dispensing cash using a cash dispenser 223. The printer 221, card reader 222 and cash dispenser 223 are placed behind the interface areas 202.

In some embodiments, a number of components of the ATM can be placed behind the interface area of the ATM. For example, the card reader, the printer and the cash dispenser may be placed behind the interface area. Placing these components behind the interface area can protect these components from damage and debris. These components can be accessible to the user via orifices. For example, when the printer is behind the interface area, the interface area can include an orifice which delivers printed receipts to users of the ATM. In some embodiments, some of these components do not have orifices. For example, a contactless card reader does not need an orifice.

The Sensors

In an example embodiment, the ATM can include at least one sensor. The at least one sensor can be placed anywhere on the ATM or anywhere near the ATM. For example the sensor can be placed on the housing of the ATM, the interface area, on the floor in front of the ATM, or even on a building adjacent to the ATM. In one embodiment, the sensor can be placed elsewhere and the sensor can be in contact with the ATM using a network, e.g., the Internet.

As one example, the sensor can be a camera or microphone. The camera can record what appears before the ATM (or camera) and the processor of the ATM can analyze the photo or video. Using this analysis, the ATM can, e.g., adjust the position of the display of the ATM. The ATM can also indicate to the user whether the user is close enough to the ATM, e.g., using the indicator.

As another example, the sensor can be a distance measurement sensor, e.g., an optical sensor, an ultrasonic sensor, a laser sensor, a displacement sensor, etc. In this example, the sensor can detect a distance between an object and the sensor or the ATM. In one embodiment, the sensor can measure a distance between two objects, e.g., the ATM and an object appearing before the ATM. In another embodiment, the distance measurement sensor can determine a distance between the display and an object in front of the display.

This sensor can ensure that as the display (or the interface area) is repositioned to become more accessible to the user, the display (or the interface area) is not hitting the user, user's vehicle or another object. For example, as the display is moving out of the ATM, the sensor can measure the distance between the user's car and the display. If the display is too close to the user's car, the sensor can transmit a signal to the processor of the ATM to stop repositioning of the display. The sensor in this example can be a sonar sensor. Other sensors can also be used for this purpose.

As yet another example, the sensor can be placed outside of the housing of the ATM, e.g., on the ground in an area in front of the ATM. This sensor can be a scale, a laser sensor, a camera, etc. When a car moves on or in front of the sensor, the sensor can detect the presence of the car and transmit a signal to the ATM. The sensor can be wired to the ATM, or it can be wirelessly connected to the ATM. The sensor can also be connected to the ATM using a network such as the Internet.

As yet another example, the ATM can be connected to a network, e.g. the Internet. The ATM can receive a signal from the network and instigate an action based on the signal. The signal can reflect a sensor reading by a sensor or device connected to the network. For example, the sensor can be a camera connected to the Internet, and the camera can provide a photo to the ATM. Based on the photo, the ATM can adjust the position of the display (or the interface area).

The signal can also reflect a command by a user connected to the network. For example, a smart device of a user can transmit a signal to the ATM form the Internet and the ATM can receive this signal. Based on this signal, the ATM can adjust the position of the display (or the interface area) of the ATM. The user can also send the signal to the ATM using a wireless connection.

Display or Interface Area Movements

In an example embodiment, the display (or the interface area) can be attached to the ATM using a mount assembly ("mount") or another implement. The mount can be fixed to the housing or another part within the ATM. The mount can facilitate movement of the display (or the interface area) in various directions. For example, a display (or an interface area) attached to the mount can be movable relative to the housing through one or more degrees of freedom including tilt, swing, pan, and telescope degrees of freedom. In some embodiments, the display (or the interface area) can be movable in all six degrees of freedom.

The phrase "degrees of freedom" can mean the set of independent displacements and/or rotations that specify the displacement or position or orientation of a body. A body that moves in three-dimensional space may have three translational degrees of freedom and three rotational degrees of freedom for a total of six degrees of freedom. Translation is movement without rotation, while rotation is angular motion about an axis.

In an example embodiment, a wall behind an ATM can define an X-Y plane, with the X-axis oriented horizontally and the Y-axis oriented vertically, with a Z-axis extending out of the X-Y plane away from the wall.

A tilt means rotational movement about the X-axis. Tilt has the same meaning as pitch in nautical or mechanical terms. A pan means rotational movement about the Y-axis. Pan has the same meaning as yaw in nautical or mechanical terms. The mount can also make a rotational movement along the Z-axis. Tilt and pan are rotational movements.

A swing means movement along the X-axis (e.g., movement left and right). Swing has the same meaning as sway in nautical or mechanical terms. A telescope means movement along the Z-axis (e.g., movement forward and backward). Telescope has the same meaning as surge in nautical or mechanical terms. The mount can also make a movement along the Y-axis. Swing and telescope are translational movements.

In one embodiment, the ATM can include a first mode of operation and a second mode of operation for the display. In the first mode of operation, the display is not extended away from the interface area. For example, if the display is imagined on a first plane, and the interface area is imagined on a second plane, the first and second planes can coincide or overlap (or substantially coincide or overlap) when the ATM is in the first mode of operation. In one embodiment, in the first mode of operation, the first and second planes can somewhat coincide or overlap. In the second mode of operation, the display is extended away from the interface area. For example, if the display is imagined on the first plane, and the interface area is imagined on the second plane, the first and second planes do not coincide or overlap when the ATM is in the second mode of operation. In the second mode of operation, the display can be distally moved away from the interface area.

In one embodiment, the ATM can include a first mode of operation and a second mode of operation for the interface area. In the first mode of operation, the interface area is not extended or moved relative to the housing of the ATM. In the second mode of operation, the interface area can be extended or moved relative to the housing of the ATM.

In one embodiment, the mount can include an electric motor, actuator or other similar devices which can cause movement of the mount in one or more directions. In this embodiment, the processor of the ATM can transmit a signal to the electric motor to cause movement of the mount in any of the directions discussed above.

In another embodiment, a user can guide the mount (and the display attached thereto) into various directions or positions, including the positions discussed above.

In some embodiments, to ensure safety and security of the ATM, the display (or the interface area) can be placed in an enclosure. In these embodiments, the display enclosure (or the interface enclosure) can be attached to the mount or implement. The enclosure can be, e.g., a rectangular box, which can protect the display (or the interface area) against vandalism, fire, moisture, etc.

Figure 3:
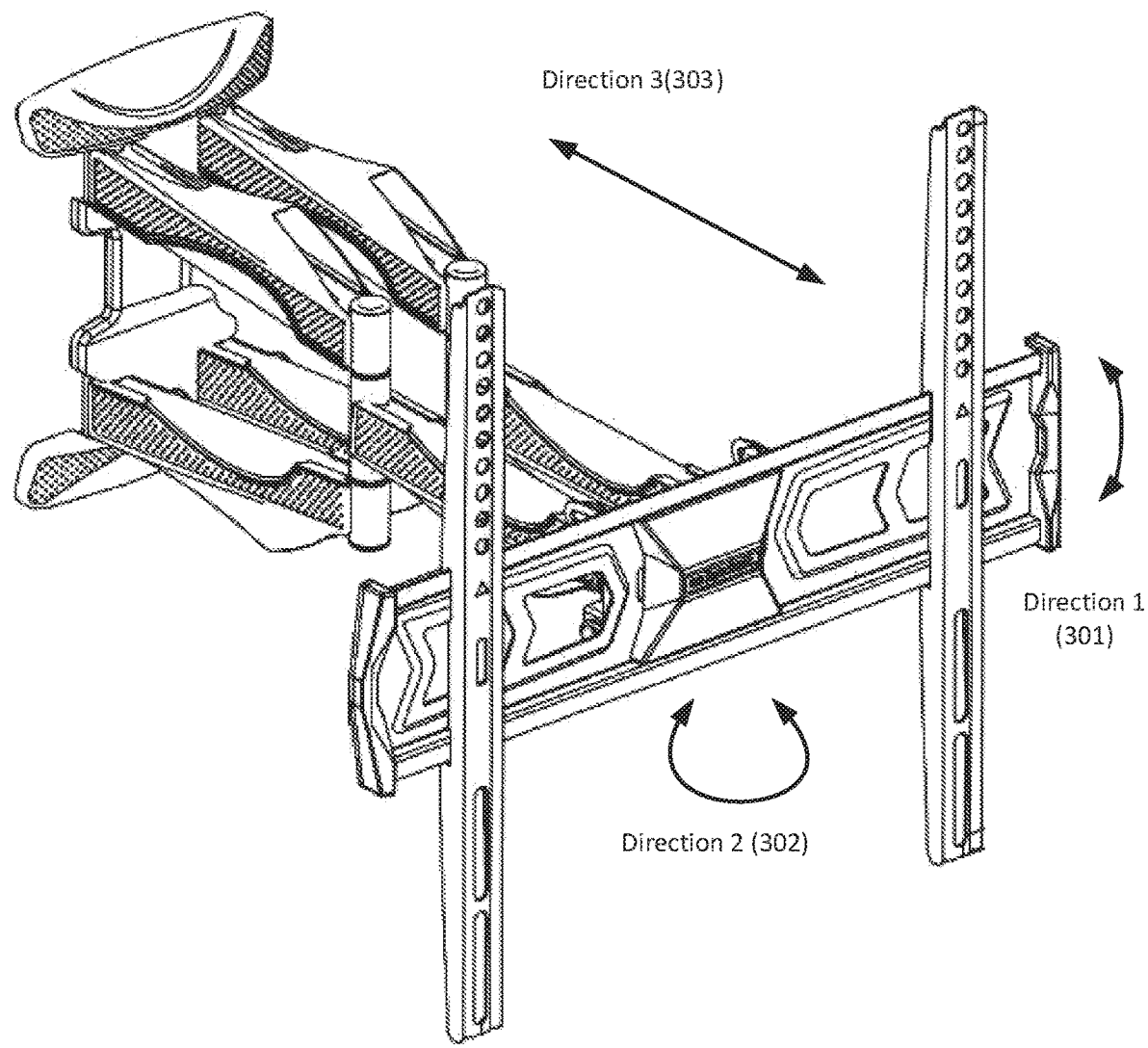
FIG. 3 shows a mount according to an example embodiment.

FIG. 3 shows a mount 300 according to an example embodiment. In this example embodiment, the mount 300 is not a motorized mount. As such, a user can push or pull the mount to a desired position. For example, the mount can move in the three directions displayed: direction 301, direction 302 and direction 303. In another example, the mount can be motorized and the movement of the mount can be assisted or controlled by the motor.

Figure 4:
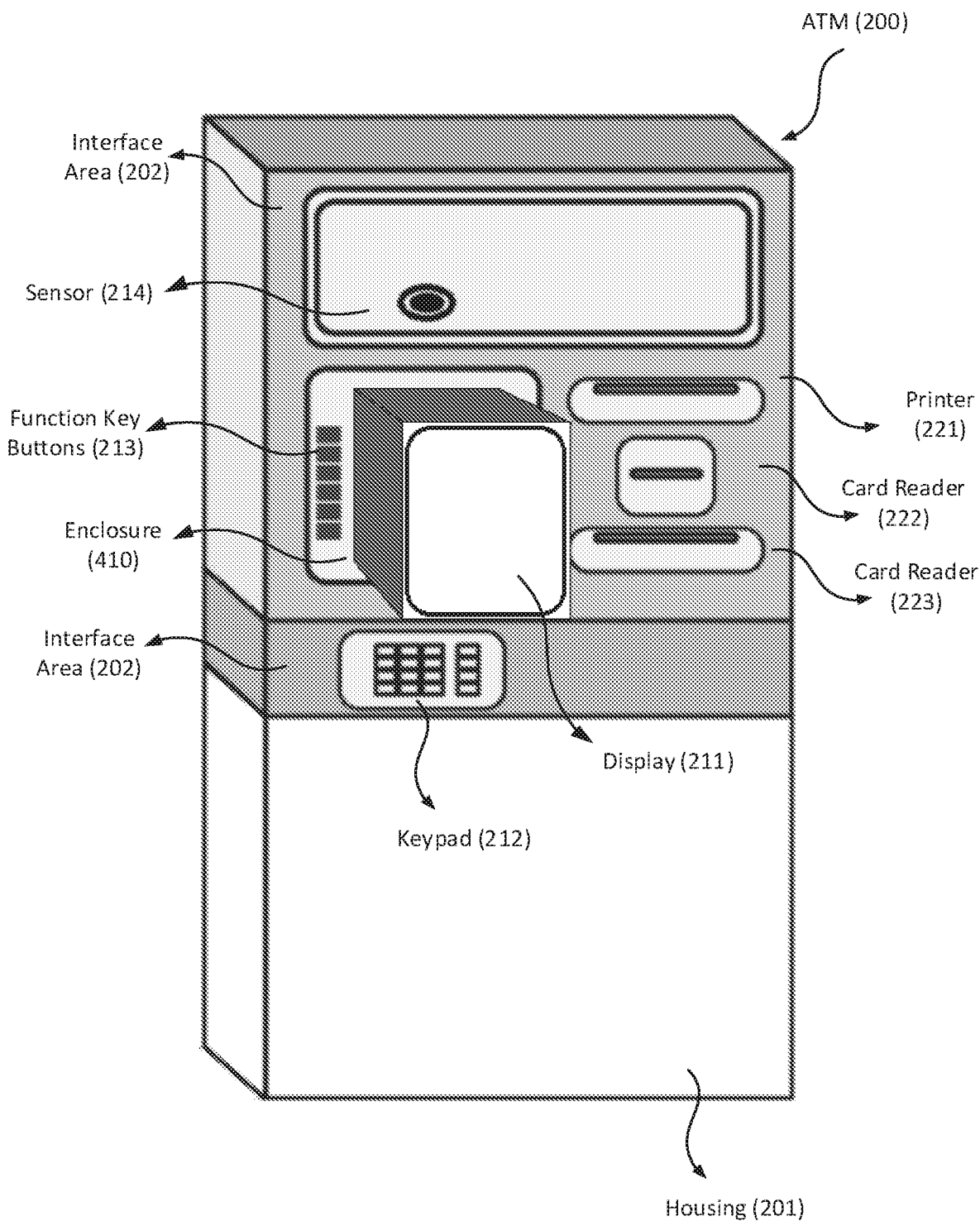
FIG. 4 shows the ATM with an extended display.

FIG. 4 shows the ATM 200 with an extended display. In this example embodiment, the sensor 214 of the ATM 200 can detect that a driver is in front of the ATM. In response, the sensor can obtain sensory information which can facilitate determination of 3-D coordinates of the driver. In response, the processor of the ATM commands a motor of the motorized mount to reposition the display 211 of the ATM 200 such that the display 211 is more accessible to the driver. In response, the motor can push the mount out. In this example embodiment, the display 211 is placed in an enclosure 410. This enclosure protects the display 211 as well as internal components of the ATM 200.

The Sensor Related Functionalities

In an example embodiment, the ATM can include a camera. The camera can take photos or videos. For example, the camera can take photos or videos of objects moving in front of the ATM. The camera can transmit the photos or videos captured to the processor. Using the operating system, the processor can analyze the photos or videos. For example, the operating system can include an object recognition application or a facial recognition application. Using these applications, the processor can detect objects (e.g., cars or wheelchairs) or faces in the photos or videos.

In an example embodiment, the ATM can include a sensor for measuring distance from an object (or a point on the object). The sensor can measure a distance from the sensor (or other point on the interface area of the ATM) to an object in front of the ATM. For example, the sensor can measure a distance between a face of a user and the display (or the interface area). In some embodiments, the sensor can determine a height for the object (or a point on the object). For example, the sensor can determine how tall a person in front of the ATM is. In some embodiment, the sensor can detect 3-D coordinates for the object (or a point on the object).

Using the distance, height, or 3-D coordinates information, the processor can calculate a direction (or vector) for movement of the display (or the interface area) to enhance accessibility of the display (or the interface area). In one embodiment, the direction (or vector) can be calculated using the 3-D coordinates of the display in a non-extended position and the 3-D coordinates of the face of the user. For example, a drive-through ATM can include the sensor and features described in this disclosure. A driver of a vehicle can park the vehicle close to the ATM. The sensor can detect the face of the driver and the sensor can determine the 3-D coordinates for the driver's face. The processor can further determine if the driver's face is located farther than a threshold distance. If that is the case, the ATM can move the display of the ATM in the direction (or vector) of the face of the driver so that the display is accessible to the driver. Specifically, if the processor determines that the user's face is below the display and that the driver's face is farther away than the threshold distance, the processor can push the display to a lower height while extending or repositioning the display (similar to what is displayed in FIGS. 4 and 5). Likewise, if the processor determines that the user's face is above the display and that the driver's face is farther away than the threshold distance, the processor can push the display to a higher height while extending or repositioning the display. Other repositioning movements are also possible. For example, the processor can cause tilting or rotation of the display (or the interface area) to accommodate the user (e.g., FIG. 5).

In an example embodiment, the ATM can store an acceptable range of distances, heights or coordinates for the object that approaches the ATM. These ranges can be the range which do not require the ATM to make any adjustments to the display (or the interface area). The ATM can also store or calculate ranges of distances, heights or coordinates for which the display (or the interface area) can be repositioned to make the display (or the interface area) more accessible to the user. In one embodiment, the ATM can also store or calculate a range of distances, heights or coordinates for which the object is too far from the ATM, and thus, the ATM will not make any adjustments to the position of the display (or the interface area). In this embodiment, the ATM can display a signal using the indicator to inform the driver that the driver is too far from the ATM.

In some embodiments, the display (or the interface area) positioning or repositioning process can start or occur automatically. For example, a sensor of the ATM can periodically, intermittently or continuously search for objects that approach the ATM. Once an object is within an acceptable distance from the ATM, the sensor can send a signal to the processor, which can in return adjust the position of the display (or the interface area) based on the distance of the object from the ATM.

In other embodiments, an event can trigger positioning or repositioning the display (or the interface area) of the ATM. For example, the triggering event can be inserting an ATM card in the card reader of the ATM. As another example, the ATM can include a button, which when pressed will cause the ATM to search for an object in front of the ATM, and reposition the display (or the interface area) based on a distance between the ATM and the object. As yet another example embodiment, the ATM can receive a wireless signal or a signal from a network which can direct the ATM to reposition the display (or the interface area) of the ATM.

In one example embodiment, the ATM can store a database of objects and positions. For example, every time a user visits the ATM, the ATM can store the user's car and the position the user requested. Using this information, the ATM can predict what position to move the display (or the interface area) when similar objects visit the ATM. For example, every time a convertible car visits the ATM, the ATM can adjust the display (or the interface area) to a position predicted for convertible cars. In another example embodiment, the ATM can store photos of users who visit the ATM and the positions of the display (or the interface area) the users request. When the same user visits the ATM, the ATM can adjust the position of the display (or the interface area) the same as before.

In this disclosure, some of the movement functionalities of the ATM are described with respect to the display and other movement functionalities are described with respect to the interface area. One of ordinary skill in the art recognizes that these movement functionalities are interchangeable, i.e., a movement functionality for the display is equally applicable to the interface area and vice versa.

Similarly, one of ordinary skill in the art recognizes that in some embodiments, it is possible that the input device, e.g., keypad, can be movable relative to the interface area. Additionally, it is also possible that both the display and the input device move relative to the interface area. In one embodiment, it is possible that the interface area is not movable at all. In another embodiment, the interface area can be movable relative to the housing, e.g., the interface area is movable relative to the housing and the input device is movable relative to the interface area.

Connection to an Application

In an example embodiment, the ATM can connect to a smart device. The connection can be a wired connection or a wireless connection. An application of the smart device can display a user interface to the user. Using the user interface, the user can command the ATM to move the display (or the interface area) in a direction which makes the display (or the interface area) accessible to the user.

In one embodiment, the user's smart device can include an application. When the smart device executes the application, the application can display a user interface. The user interface can include various pages. On one page, e.g., the connection page, the application can facilitate connection to an ATM. For example, the page can display various ATMs close to the user. These ATMs can be the ATMs that are discoverable, e.g., wirelessly or through a network such as the Internet. Discoverable ATMs are ATMs which can connect to a smart device. Discoverable ATMs can also be ATMs which provide for user connectivity and can be adjusted by user instruction via a smart device. The user can select one of these ATMs and the smart device can connect or pair with the ATM.

Figure 7:
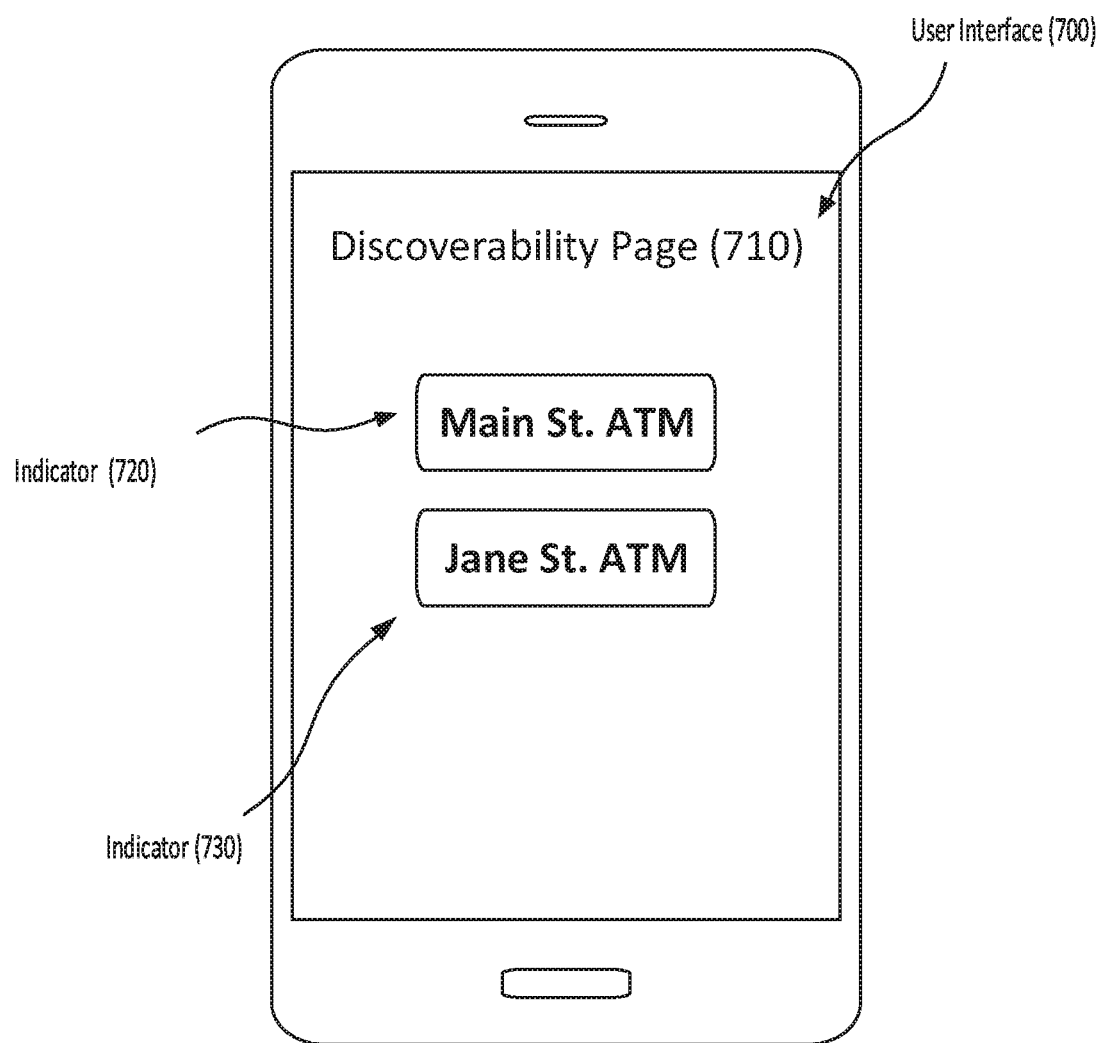
FIG. 7 shows an example user interface for an application of a smart device.

FIG. 7 shows an example user interface for an application of a smart device. In this example embodiment, a user interface 700 can display a discoverability page 710, which includes an indicator 720 for an ATM located on the Main St. and an indicator 730 for an ATM located on the Jane Street. Upon pressing each indicator, the application is configured to connect with the respective ATM represented by the indicator.

In another page, e.g., the adjustment page, the user interface can provide the user with an option to trigger an automatic adjustment of the display (or the interface area) by the ATM. For example, this page can include a button. Once the user presses the button, the smart device can transmit a signal to the ATM. The smart device can transmit the signal using a wireless connection, a wired connection or even through a network such as the Internet. Once the ATM receives the signal, the ATM can adjust the position of the display (or the interface area) based on sensor data received from the sensor of the ATM.

In one embodiment, the adjustment page can provide the user with an option to adjust the display (or the interface area) of the ATM. For example, the user interface of the application can show one or more control buttons. Each control button can be associated with a specific movement of the display (or the interface area). By pressing the control buttons, the application can transmit a signal to the ATM, and the ATM can command the motor to move the display (or the interface area) as specified by the signal. The user interface can show the control buttons, e.g., based on a communication from the ATM which delineates the range of possible movements for the ATM.

Figure 8:
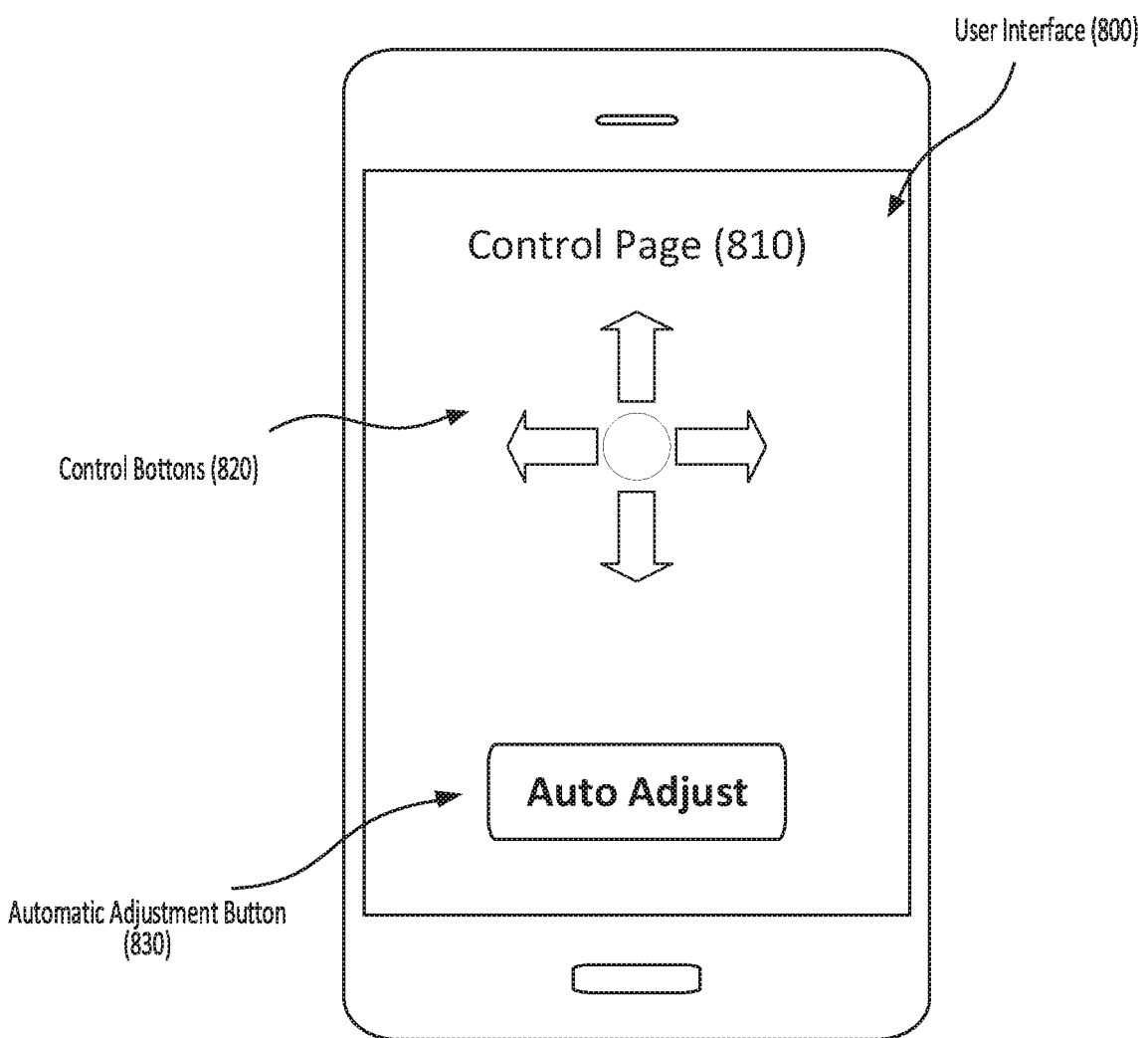
FIG. 8 shows another example user interface for the application of the smart device.

FIG. 8 shows another example user interface for the application of the smart device. In this example embodiment, a user interface 800 can display a control page 810, which includes a set of buttons 820 for controlling an ATM and an automatic adjustment button 830 for requesting the ATM to automatically adjust the screen.

There can be various connection modes for connecting a smart device to an ATM. In one example, the ATM can include a connection port and the smart device can connect to the ATM through the connection port. For example, the ATM can include a USB port, and the user can use a USB cable to connect the smart device to the ATM. In another example, the connection can be a wireless connection, e.g., Wi-Fi, Bluetooth, NFC, radio or cellular connection. Connection through a network is also possible. For example, the smart device can connect to the ATM through the Internet.

In one example, the smart device can act as a card reader and transfer certain information from a card to the ATM. For example, using the NFC technology, the smart device can read a contactless card. The application of the smart device can transmit this information to the ATM. In response, the ATM can process the information and transmit a signal to the smart device. For example, in response to receiving the user's account information, the ATM can adjust the display (or the interface area) position to a position specified for the account number, e.g., a previously requested position. As another example, in response to receiving the user's account information, the ATM can ask the user to enter the passcode for the account. The application of the smart device can include a page for entering the passcode, e.g., a passcode page. On the passcode page, the user can enter the user's passcode and the smart device can transmit the passcode to the ATM.

Figure 5:
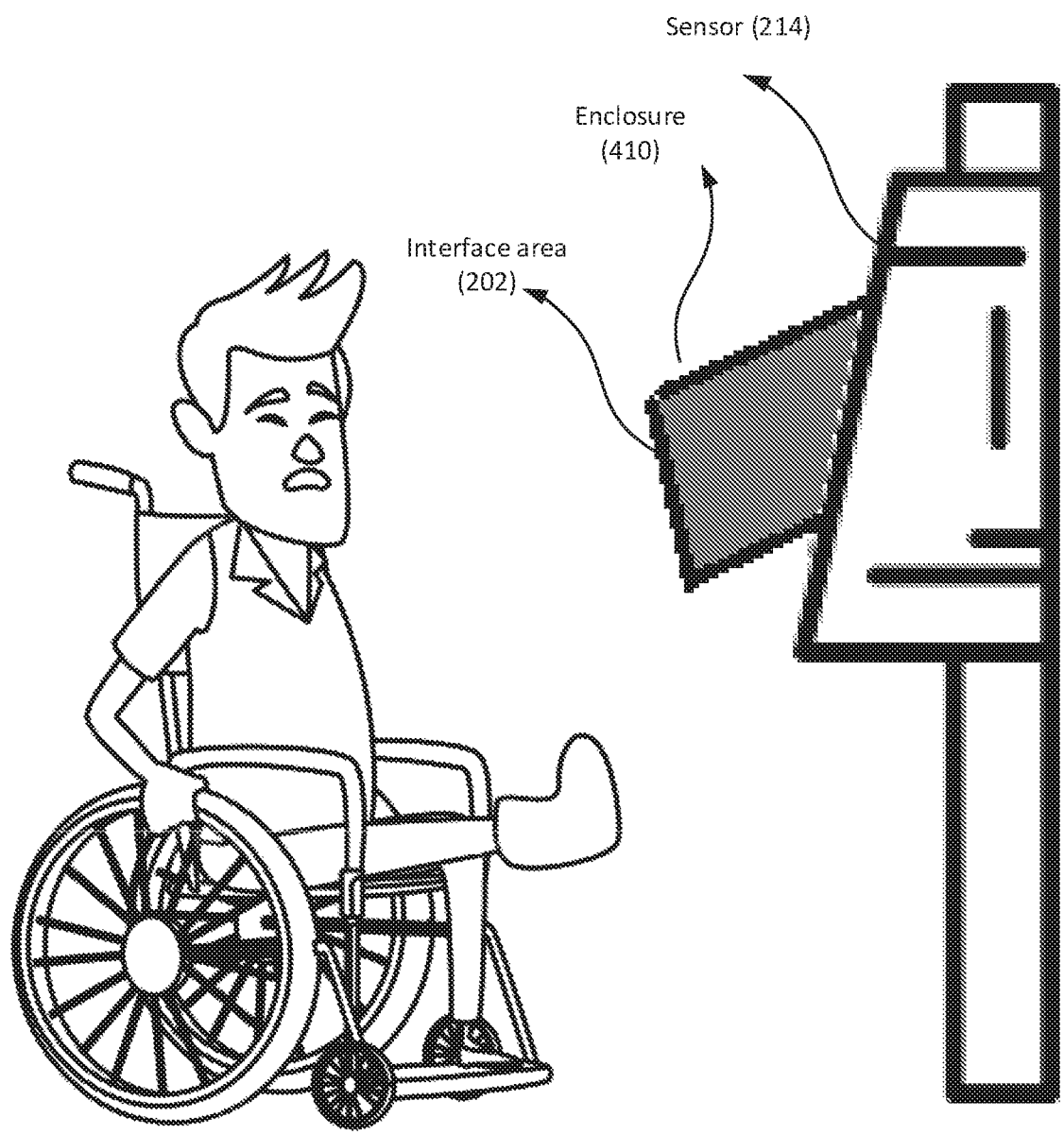
FIG. 5 shows another example ATM with an extended display.

FIG. 5 shows another example ATM with an extended interface area. In this example embodiment, a wheelchair-bound user can approach the ATM device. The user can connect to the ATM using the user's smart phone. The user can send a command to the ATM to indicate that the user is near the ATM and that the user desires the ATM to adjust the position of the interface area 202 of the ATM. The ATM can receive this command, and based on a sensor detection of the 3-D coordinates of the user's face using the sensor 214, the ATM can extend the interface area 202 and the enclosure 410 so that the interface area is closer to the user's face.

In another embodiment, the user can specify on an application of the smart device a direction which the user desires the ATM to reposition the display (or the interface area). For example, the user can ask the ATM to extend the display out and lower it. The ATM can receive a command from the smart device indicating the desired position. In response, the ATM can command the motor of the motorized mount to adjust the position of the display as requested by the user.

Embodiments of this disclosure describe various features and functionalities for ATMs. However, these descriptions are not limited to ATMs. In fact, these features can be implemented in other devices which have components similar to ATMs, e.g., kiosks or ticket machines.

Technical Implementation of a Processing Unit

Figure 6:
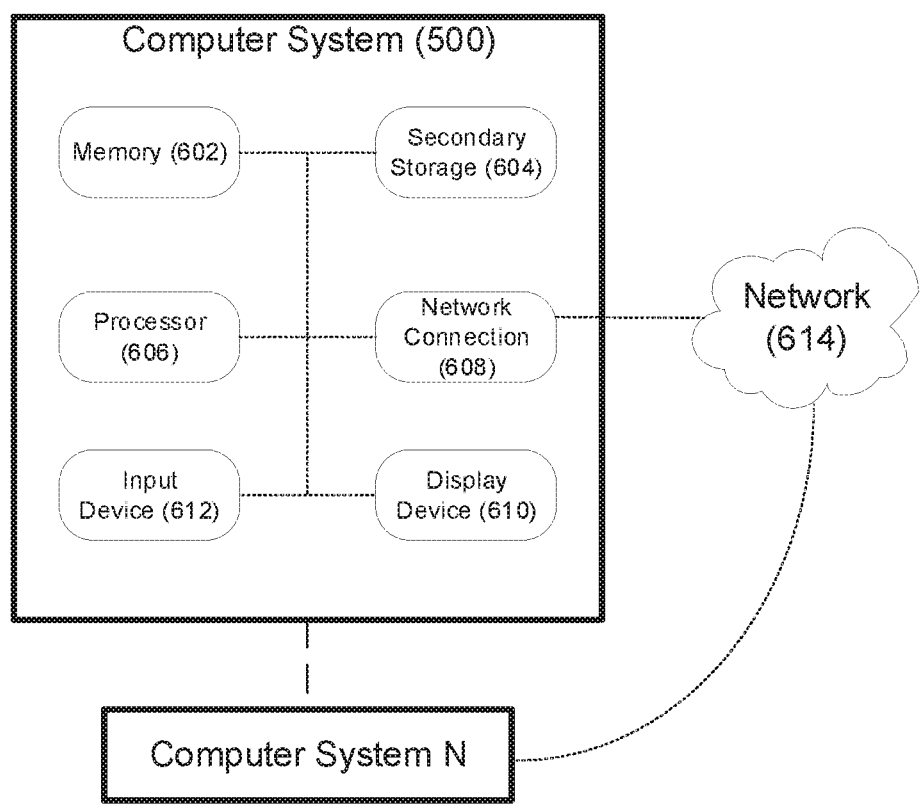
FIG. 6 illustrates exemplary hardware components for a processing unit.

FIG. 6 illustrates exemplary hardware components of a server or processing unit. A computer system 600, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 600, may run an application (or software) and perform the steps and functionalities described above. Computer system 600 may connect to a network 614, e.g., Internet, or other network, to receive inquires, obtain data, and transmit information and incentives as described above.

The computer system 600 typically includes a memory 602, a secondary storage device 604, and a processor 606. The computer system 600 may also include a plurality of processors 606 and be configured as a plurality of, e.g., bladed servers, or other known server configurations. The computer system 600 may also include a network connection device 608, a display device 610, and an input device 612.

The memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as those described herein, which are stored in memory 602 or secondary storage 604, or received from the Internet or other network 614. The processing by processor 606 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 600 may store one or more database structures in the secondary storage 604, for example, for storing and maintaining the information necessary to perform the above-described functions. Alternatively, such information may be in storage devices separate from these components.

Also, as noted, processor 606 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 600.

The input device 612 may include any device for entering information into the computer system 600, such as a touch-screen, keyboard, mouse, cursor-control device, microphone, digital camera, video recorder or camcorder. The input and output device 612 may be used to enter information into GUIs during performance of the methods described above. The display device 610 may include any type of device for presenting visual information such as, for example, a computer monitor or flat-screen display (or mobile device screen). The display device 610 may display the GUIs and/or output from sub-system components (or software).

Examples of the computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system 600 may use multiple computer systems or servers as necessary or desired to support the users and may also use back-up or redundant servers to prevent network downtime in the event of a failure of a particular server. In addition, although computer system 600 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 600, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A device comprising:
a housing including:
an interface area including a display, a camera, a card reader and a cash dispenser;
a processor and a memory; and
a vault connected to the cash dispenser;
wherein:
the interface area is configured to distally move away from the housing;
the camera is configured to receive data; and
the processor is configured to effectuate a distal movement of the interface area based on the data.

2. The device of claim 1, wherein the data is a photo.

3. The device of claim 2, wherein the processor is configured to detect a face in the photo.

4. The device of claim 3, wherein the processor is configured to calculate:
3-D coordinates for an object associated with the face; and
a direction vector from the interface area to the object.

5. The device of claim 4, wherein the processor is configured to effectuate the distal movement of the interface area based on the direction vector from the interface area to the object.

6. The device of claim 5, wherein the distal movement of the interface area decreases a distance between the interface area to the object associated with the face.

7. The device of claim 3, wherein the processor is configured to calculate a distance of the interface area to the object.

8. The device of claim 7, wherein the processor is configured to effectuate the distal movement of the interface area based on the distance.

9. The device of claim 2, wherein the processor is configured to detect an object in the photo.

10. The device of claim 9, wherein the memory stores a predetermined distal movement for each object.

11. The device of claim 10, wherein the processor is configured to effectuate the distal movement of the interface area based on the predetermined distal movement.

12. The device of claim 1, further comprising a transceiver which is configured to detect a wireless signal from a smart device.

13. The device of claim 12, wherein the processor is configured to effectuate the distal movement of the interface area based on the wireless signal.

14. The device of claim 12, wherein in response to receiving the wireless signal at the transceiver, the processor is configured to detect an object.

15. The device of claim 1, further comprising a mount, wherein:
    the mount includes a motor in communication with the processor;
    the motor is configured to reposition the mount; and
    the interface area is attached to the mount.

16. The device of claim 15, wherein the processor is configured to transmit a signal to the motor to reposition the mount.

17. The device of claim 15, wherein the mount is movable relative to the housing through at least two degrees of freedom.

18. The device of claim 1, further comprising an enclosure, wherein the interface area is placed inside the enclosure.

19. The device of claim 1, further comprising a sensor, wherein, as the interface area moves, the sensor transmits a signal to the processor if a distance between the interface area and an object falls below a predetermined distance.

20. The device of claim 1, wherein:
    the processor is configured to transmit a signal through a transceiver to a smart device;
    the signal is configured to cause the smart device to generate a prompt to enter a passcode; and
    the transceiver is configured to receive a second signal from the smart device including the passcode.

* * * * *